United States Patent Office 3,344,202
Patented Sept. 26, 1967

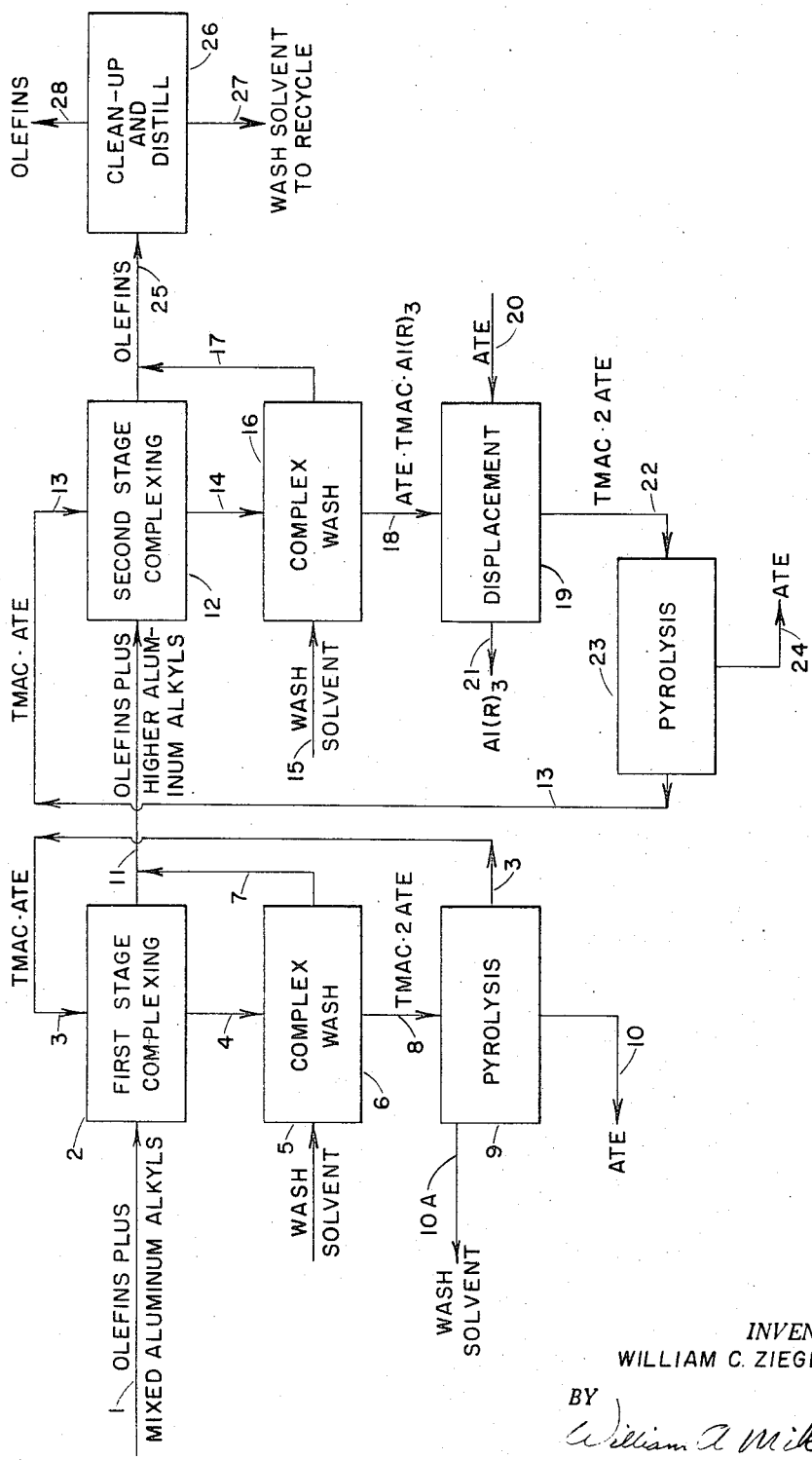

3,344,202
OLEFIN PURIFICATION PROCESS
William C. Ziegenhain, Ponca City, Okla., assignor to Continental Oil Company, Ponca City, Okla., a corporation of Delaware
Filed May 21, 1965, Ser. No. 457,554
10 Claims. (Cl. 260—677)

This invention relates to a process for purifying olefins resulting from the so-called growth process. More particularly, it concerns a process for removing aluminum alkyl compounds by a two-stage complexing from olefins resulting from displacement of growth product.

A recent important discovery in the field of organoaluminum chemistry was the finding that aluminum alkyls will combine with a limited number of organic and inorganic compounds to yield relatively heat-stable complexes. The substances suitable for complexing with the aluminum compounds in this manner are singularly characterized in being strong electron donors. The ability of a compound to yield an electron readily however, does not in itself assure that the compound will coordinate with an aluminum alkyl to provide a satisfactory stable complex. Suitable complexing agents must also meet certain molecular configuration requirements. Some notable examples of electron donors which form stable complexes with the aluminum alkyls include: all of the alkali metal fluorides, rubidium chloride and cesium chloride or bromide; the alkali metal salts of certain pseudo halides, e.g., the alkali metal cyanides and azides; the tetraalkyl ammonium halides as well as similarly quaternized compounds based on the elements phosphorous, arsenic, sulphur, selenium or tellurium; a plurality of ethers and thio-ethers of which at least one of the ether substituents is an aryl group; and tertiary amines having at least one aryl substituent.

The complexes of aluminum alkyl and the coordinating compound are schematically depicted by the following general formula in which the letter A represents a mole of a suitable complexing agent corresponding to any of the applicable compounds mentioned above:

$$A \cdot (AlR_3)_{1\text{-}2\text{-}1}$$

As indicated by the formula given, the molar amount of aluminum trialkyl present in the members of this broad class of complexes varies depending upon the nature of the complexing agent. Lately, special interest has centered upon those complexing agents capable of uniting with an aluminum alkyl to form two types of stable complexes which, from a composition standpoint, only differ from one another in regard to aluminum alkyl content. Of the complexing agents enumerated hereinabove, those adapted to form the two types of complexes include the alkali metal fluorides, the alkali metal cyanides, the alkali metal azides and the tetraalkyl ammonium halides. The fluoride salts, as well as the quaternized ammonium compounds yield, in one form, a complex containing two moles of the aluminum trialkyl per mole of the complexing agent. These specific complexing agents will also yield a stable 1:1 complex, that is, a complex composed of one mole each of the complexing agent and aluminum trialkyl. The combining ratios for the azides or the cyanides are somewhat different from those of the quaternary ammonium salts or the fluorides. For example, an alkali metal azide will combine with 1.8 moles of the aluminum alkyl to provide one form of complex; whereas, in the other stable form the molar ratio of aluminum alkyl to an azide is in the order of 2.1. On the other hand, the two stable forms of complexes derived from the cyanides respectively contain 1.5 and 2 moles of aluminum alkyl.

An important property of the complexes described directly hereinabove which renders them particularly useful in a variety of industrial applications resides in the fact that the higher form of complexes, i.e., the one containing the greater combined amount of aluminum alkyl, can be pyrolyzed or thermally cleaved so as to convert this form into a mixture of free aluminum alkyls and the stable complex composition containing the lower combined amount of aluminum alkyl. Where the complexing agent is either a fluoride, cyanide, azide or quaternary ammonium compound, it is also possible to cleave the lower aluminum alkyl-containing complex thermally to obtain the complexing agent in a free state. In attempting to cleave to this extent, however, the elevated temperature conditions required inevitably result in a substantial amount of decomposition of the cleaved aluminum alkyls. Accordingly, cleaving of the lower complexes of this type is seldom, if ever, practiced. In this connection, it is mentioned that the etherates formed in employing an ether or thioether as a complexing agent can be thermally cleaved without experiencing substantial decomposition of the aluminum alkyls. The ether-type complexing agent, as well as the tertiary amines, provide only one form of a complex, specifically an equi-molar one.

On several occasions in the preceding discussion, it was indicated that the complexes herein concerned have specific use applications. One important application involving this phase of complexing chemistry will next be discussed briefly. This discussion will not only serve to point up an important utility of such complexes, but will additionally provide an insight as to the existing problems in this art which can be obviated through the implementation of my invention.

Complexes of aluminum alkyls play an important function in those methods for preparing either alcohols or alpha-olefins based upon the Ziegler process wherein ethylene is reacted with a lower trialkyl aluminum, usually aluminum triethyl. This reaction is commonly termed the "growth reaction." In accordance with this reaction, ethylene progressively adds to the ethyl radicals of the aluminum compound to yield higher molecular weight aluminum alkyls. This reaction is carried out under superatmospheric conditions and at an elevated temperature, generally in a range of about 65–150° C.

In effecting the growth reaction, the ethylene molecules do not add to the existing alkyl groups associated with aluminum in a uniform manner. As a matter of fact, there is obtained during the course of the reaction aluminum alkyl products of which the alkyl groups vary extensively in molecular weight. This variation, however, is not haphazard; rather the resultant mixture of alkyl groups corresponds to a given statistical distribution known as the Poisson relationship. This relationship can be expressed mathematically by the equation:

$$P_{(n)} = \frac{M^n e_{-n}}{n!}$$

wherein $P_{(n)}$ represents the probability that a certain hydrocarbon radical will be formed by "$n$" additions of ethylene to the aluminum ethyl originally present, and "M" is the mean number of additions of ethylene per growing chain.

The growth product can be converted to provide either a mixture of primary alcohols or alpha-olefins corresponding in carbon atom lengths to that of the alkyl moiety of the aluminum alkyls constituting the growth product. For the present purpose, further discussion will be confined to the conversion of the growth product into a mixture of alpha-olefins. This is achieved by subjecting the growth product to a displacement reaction wherein the growth product is reacted with additional quantities of ethylene under such conditions whereby the ethylene displaces the higher alkyl groups of the growth product to yield the mixture of aluminum triethyl and alpha-olefins. The displacement reaction can be either thermally or catalytically induced.

Upon completion of the displacement reaction, the resultant product consists of a homogeneous mixture of aluminum triethyl and the higher alpha-olefins. This mixture must then be fractionated in order to recover the aluminum triethyl for reuse purposes. Since the boiling point of aluminum triethyl substantially corresponds to the boiling point of the dodecene present in the displacement reaction mixture, the former cannot be recovered in a satisfactorily pure form by thermal fractionation methods. Separation of the aluminum triethyl from the displacement reaction product can, however, be readily achieved by complexing the aluminum triethyl to result in two phases consisting of the complex phase and the olefins. In accordance with this procedure, the complexing is carried out to the extent whereby the higher complex is obtained and thereupon the subsequently separated complex is cleaved to yield the lower complex and free aluminum triethyl. The latter is then recovered by distillation and recycled to the growth reactor.

By far, the bulk of the aluminum alkyls existing in the displacement reaction consists of aluminum triethyl. There are, however, also small amounts of higher undisplaced aluminum alkyls present in the displacement reaction mixture. These higher aluminum alkyls will likewise complex with the cleaved complex recycled to the displacement reactor. In a cleaving procedure designed to regenerate the full or higher complex, it is not feasible to remove the higher aluminum trialkyls, i.e., aluminum tributyl and higher, from the cleavage products because of their high boiling points. If one attempts to distill off these higher aluminum trialkyls, the temperature and/or residence conditions that must be observed in any of the conventional distillation techniques necessarily result in the pyrolysis of the lower complex with attendant substantial decomposition of the aluminum alkyls. Consequently, in following the usual cleaving conditions designed to avoid any significant decomposition of the aluminum alkyls, the higher aluminum alkyls will remain with the complex phase and continue to increase in concentration until an equilibrium relationship is attained. At this point the olefin effluent of the displacement reactor will contain the same amount of undisplaced heavier aluminum alkyls as was initially present in the displacement reaction product. Since it is common practice to hydrolyze the displacement reaction effluent as the final purification step in order to remove any aluminum compounds contained therein, the higher aluminum alkyls that are present will form paraffins having boiling points very close to that of the olefins; and consequently, an olefin product will result having up to several percent paraffins. The foregoing represents a significant problem in the manufacture of pure α olefins via the growth reaction. It will be appreciated by those skilled in the art how a problem such as this can be obviated through the practice of the present invention. The aforedescribed application is, however, only representative of but one of several in which the basic concept underlying the instant invention can be beneficially employed.

More recently, there has been disclosed and claimed in U.S. Ser. No. 385,049, filed July 24, 1964, by William C. Ziegenhain and titled "Process for Recovering Higher Aluminum Alkyls from Complexes Containing Same" the process for recovering the alkyl groups having a carbon atom length of greater than two of the hereinafter-described complexes of aluminum alkyl compounds wherein said groups are recovered in the form of trialkyl aluminum which comprises:

Reacting at a temperature between about 0° C. and 300° C. aluminum triethyl with a complex of aluminum alkyls and a complexing agent capable of coordinating with two distinct molar amounts of trialkyl aluminum to form two corresponding relatively heat-stable forms thereof and wherein the alkyl radicals present in said complex have in excess of one carbon atom, including such radicals having in excess of two carbon atoms;

Said reaction being carried out to the extent whereby a substantial amount of said alkyl radicals having an excess of two carbon atoms initially contained by the complex are converted to non-complexed aluminum alkyl and thereupon fractionating the reaction mixture to recover the non-complexed aluminum alkyls.

Other aspects, objects and the several advantages of this invention will become apparent upon study of this specification, the appended claims, and the drawing, which is a schematic flow diagram of one embodiment of the invention.

The present invention comprises an improved process for purifying olefins based upon the invention of U.S. Ser. No. 385,049.

According to the present invention, there is provided a process for removing aluminum alkyls from olefins which comprises contacting the feed stream with a complex-forming material in two serial stages, the complexing agent being capable of forming complexes of at least two molar contents of aluminum alkyl; in the first contact stage, sufficient complexing agent is used to react with substantially all of only the lowest molecular weight aluminum alkyl in the olefin stream, and in the second stage, sufficient complexing agent is used to react with substantially all of the aluminum alkyls remaining in the olefins. In one presently-preferred embodiment of this invention, the "high-level" complex resulting from the second-stage reacting, wherein aluminum alkyls of greater than the lowest molecular weight species are complexed, is regenerated by first displacing from the complex the higher molecular weight aluminum alkyl species with lower molecular weight species; the displaced high molecular weight aluminum alkyl can then be readily separated from the remaining complex, and the complex can be pyrolyzed to produce low molecular weight aluminum alkyls and "low-level" complex, both of which are suitable for recycle to appropriate locations of the process. The high-level complex resulting from the first-stage contacting can be more simply regenerated for recycle merely by pyrolysis; the displacement disclosed and claimed in copending U.S. Ser. No. 385,049 is not normally required here, since only the lowest molecular weight species of aluminum alkyl present in the feed olefin is removed in this stage.

Further understanding of the invention can be gained by study of the figure. In the figure, a feed stream of olefins containing aluminum alkyls of mixed alkyl radical size is introduced by way of conduit 1. This stream typically results from the growth and displacement reactions on aluminum alkyls, as discussed earlier herein. The feed stream is passed to a first complexing stage 2, wherein it is admixed with a complex forming material such as TMAC·ATE (tetramethyl ammonium chloride and aluminum triethyl in e.g. a 1:1 complex) introduced by way of conduit 3. Contact conditions in zone 2 are such as to remove from the feed olefins substantially all of only the lowest molecular weight aluminum trialkyl present therein; typically, this will be ATE. The resulting complex will be, depending on temperature and type of complexing agent used, either an immiscible liquid phase or a solid phase, and is separated from the feed stream and removed by way of conduit 4; in the present instance, where the complexing agent is exemplified as TMAC·ATE and the low molecular weight aluminum alkyl as ATE, the complex removed by way of conduit 4 will be TMAC·2 ATE. This material can be washed to remove occluded olefins with a material which is a good solvent for olefins and a poor solvent for the complex, such as n-heptane or i-octane, introduced by way of conduit 5 to the wash zone 6. Olefins and wash solvent are removed by way of conduit 7 and added to the partially-cleaned olefins, as will be later described. The washed complex is passed by way of conduit 8 to a pyrolysis zone 9, wherein it is heated to remove ATE overhead by way of conduit 10 and TMAC·ATE complex for recycle by way of conduit 3 to the first complexing stage. Wash solvent can be removed from the complex as by vaporization and removed by way of conduit 10A prior to the pyrolysis. The net result of this stage is to remove substantially all of the ATE originally present in the olefin feed; this material, which, is removed by way of conduit 10 can be recycled to the growth reaction up-stream (not shown), if desired.

Also removed from complexing zone 2 is the olefin stream, by way of conduit 11, which now contains all the aluminum alkyls present in the feed except for the ATE, which was substantially completely removed, and which also contains wash solvent and olefins from conduit 7. This stream is passed to a second complexing zone 12, wherein it is contacted with another stream of complex-forming material introduced by way of conduit 13; this complex-forming material is in a separate loop than that used in the first complexing zone, and can accordingly be the same or a different material than that used therein. Assuming the same type material to be used, there is formed in zone 12 a complex of the formula ATE·TMAC·Al(R)$_3$, where R represents a mixture of alkyl radicals of greater than two carbons in chain length. Contact conditions in zone 12 are such as to remove from the olefin stream substantially all of the aluminum alkyl content, viz. Al(R)$_3$. This resulting complex will also be either an immiscible liquid or a solid, and is removed by way of conduit 14. The complex can be washed with a solvent introduced by way of conduit 15 in a wash zone 16. Olefins and wash solvent are removed by way of conduit 17 and added to the cleaned olefins, as will be later described. The washed complex is passed by way of conduit 18 to a displacing zone 19. In this zone, the high molecular weight aluminum alkyl content of the complex is displaced or replaced by lower molecular weight aluminum alkyl introduced by way of conduit 20, in a manner described in the aforesaid copending application. The displacement results in liberation of the Al(R)$_3$, which is removed by way of conduit 21, and in formation of a different complex,

TMAC·2ATE which is removed by way of conduit 22. This latter complex is subjected to pyrolysis in zone 23 to split out ATE, which is removed by way of conduit 24 and can, if desired, be recycled to displacement via conduit 20. The pyrolysis also liberates the low level complex TMAC·ATE which is recycled to the second stage complexing via conduit 13. It can be seen that the net result of the second stage complexing loop is substantially complete removal of aluminum alkyls from the olefin stream, which alkyls are removed as Al(R)$_3$ by way of conduit 21. The cleaned olefin is mixed with olefins and wash solvent from conduit 17 and can then, if desired, be subjected to whatever final clean-up is desired. For example, the drawing illustrates the olefins being passed by way of conduit 25 to a clean-up and distillation zone 26, wherein wash solvent is removed via conduit 27, as by distillation, and can be recycled to conduits 5 and 15 if desired. The olefins can also be subjected to e.g. an acid wash to hydrolyze any last traces of aluminum compounds, and product olefin is removed by way of conduit 28.

Although the displacement in zone 19 can be effected in a continuous manner, it is more amendable to a batch-type operation. To this end, it is presently preferred to provide a plurality of second stage complexing zones 12 manifolded in parallel to inlet conduits 11 and 13 and outlet conduits 14 and 25. In this manner, the entire loop comprising the second-stage complexing zone along with conduits 13, 14, 18 and 22 along with wash zone 16, displacement zone 19, and pyrolysis zone 23 can be operated in a batch manner, with a fresh charge of TMAC·ATE either quiescent or circulating through one complexing zone 12 while the spent complexing material in another zone 12 is being regenerated.

A complex containing any significant amount of aluminum alkyls of which the alkyl group has more than two carbon atoms can be reacted with aluminum triethyl in such a manner whereby the latter preferentially displaces the higher aluminum alkyl content of the complex. If a sufficient amount of aluminum triethyl is reacted to convert the complex into its higher form, the resultant reaction mixture will be essentially composed of the higher form of the aluminum triethyl complex and the higher aluminum alkyls which were initially complexed with the complexing agent. Several fractionation methods can then be employed to achieve separation of such mixtures. If the freed aluminum alkyls contain alkyl groups ranging up to about 30 in carbon atom length, said mixtures can be feasibly subjected to molecular distillation. Likewise, an atomized spray of the mixture of the full complex and free aluminum alkyls can be contacted with a suitable stripping agent in order to effect nondestructive removal of the latter. The simplest and preferred fractionation method is an extractive one whereby the mixture of the complex and aluminum alkyls is extracted with a hydrocarbon, such as for example pentane, hexane, heptane, etc., which is capable of readily dissolving the aluminum alkyls but in which the complex is only slightly soluble. After the complexes containing the higher aluminum alkyls are subjected to the process of this invention, the subsequently recovered complete or higher complex can then be cleaved to provide aluminum triethyl for recycle and a regenerated lower complex for further complexing applications.

The reaction of the aluminum triethyl with the complexes containing the higher aluminum alkyls in accordance with this invention is to be carried out at a temperature between about 0° C. and 300° C. and more preferably between about 10° C. and 200° C. In a batch operation the displacement of the higher aluminum alkyl content of the complex by the aluminum triethyl will be realized upon intimately contacting these materials for a brief period of time at a temperature within the specified range. Thereafter, the phases that develop, namely the complex and the higher aluminum triethyl phase, can be separated in any of the methods generally described previously. Normally, only that amount of aluminum triethyl equivalent to the amount of higher aluminum trialkyl contained by the complex need be added to effect a substantial degree of displacement of the latter. However, excesses of the aluminum triethyl can be employed, as such will accumulate in the aluminum alkyl phase which then can be recovered from this phase by a simple distillation procedure.

It might at first appear that a single stage of complex contacting would suffice nicely to remove all aluminum alkyls from the hydrocarbon stream, as indeed it would for a short period of time. However, there results an accumulation of mixed aluminum alkyls complexed with the TMAC·ATE or other complexing agent which, upon pyrolysis of the complex, does not volatilize without decomposition. These higher aluminum alkyls thus build up in the TMAC·ATE pyrolysis product to an equilibrium point, and beyond this time the effluent olefins contain the same amount of Al(R)$_3$ as do the feed olefins. Upon hydrolysis of this product, an excessive amount of paraffin impurities results.

Another important feature of the present invention resides in the necessity, for best operation, of removing essentially all of the lowest molecular weight aluminum alkyl in the first stage. Using ATE as an example of this material, it can be seen that if appreciable quantities of ATE are allowed to pass the first stage complexing, this ATE will actually effect a premature displacing of higher aluminum alkyls from the high-level complex being formed in the second complexing stage, which in turn permits these higher aluminum alkyls to escape in the product stream. On the other hand, if an appreciable quantity of aluminum alkyls higher than ATE is removed in the first stage, then the equilibrium build-up discussed in the preceding paragraph occurs. By operating according to this preferred procedure, the first stage removes only ATE by complexing, and the resulting complex can be easily regenerated by simple pyrolysis. Further, ATE is typically the most predominant aluminum alkyl in the feed. The remaining aluminum alkyls, which are typically the minor proportion of the total mole-wise, are removed by the somewhat more lengthy procedure of displacement followed by pyrolysis.

Although the preceding discussion has been centered primarily on purifying olefins, it is obvious that the present method is equally applicable to removal of aluminum alkyls by complex-forming from other hydrocarbons, such as paraffins. Further, it will be obvious that the contaminated stream can contain, as the lowest molecular weight aluminum alkyl, a material other than ATE, such as aluminum trimethyl or aluminum tripropyl.

The following example will further illustrate the invention.

EXAMPLE

The following table illustrates a stream composition by mole percent based on the system illustrated in the figure.

| Stream | Mixed Olefins | Complex TMAC·ATE | Complex TMAC·2ATE | Complex ATE·TMAC·Al(R)₃ | Wash Solvent | ATE | Displacement Product | Paraffin |
|---|---|---|---|---|---|---|---|---|
| 1 | 74.7 | | | | | 24.9 | 0.4 | |
| 3 | | 69.3 | 29.7 | 1.0 | | | | |
| 4 | 9.3 | 18.0 | 71.8 | 0.9 | | | | |
| 5 | 1.3 | | | | 98.7 | | | |
| 7 | 29 | | | | 71 | | | |
| 8 | | 17.3 | 69.3 | | 13.4 | | | |
| 10 | | | | | 4.9 | 95.1 | | |
| 10A | | | | | 100 | | | |
| 11 | | 15.7 | 62.6 | | 20.3 | 0.8 | 0.6 | |
| 13 | | 70 | 30 | | | | | |
| 14 | 10 | 9 | 54 | 27 | | | | |
| 15 | 2 | | | | 98 | | | |
| 17 | 20 | | | | 80 | | | |
| 18 | | 10 | 60 | 30 | | | | |
| 20 | | | | | 5 | 95 | | |
| 21 | | | | | 10 | 45 | 45 | |
| 22 | | | 99 | 1 | | | | |
| 24 | | | | | 5 | 95 | | |
| 25 | 83 | | | | 16.9 | 0.03 | | .03 |
| 27 | 2 | | | | 98 | | | |
| 28 | 99.6 | | | | .1 | | | .3 |

Temperature and pressure conditions preferred are as follows:

| Zone | Broad Temp., °F. | Preferred Temp., °F. | Broad Pressure, p.s.i.a. | Preferred Pressure, p.s.i.a. |
|---|---|---|---|---|
| 2 | 60-300 | 100 | *TML | TML |
| 6 | 80-300 | 120 | TML | TML |
| 9 | 200-500 | 370 | .01-1.0 | .04 |
| 12 | 80-300 | 120 | TML | TML |
| 16 | 80-300 | 120 | TML | TML |
| 19 | 80-200 | 100 | TML | TML |
| 23 | 200-500 | 370 | .01-1.0 | .04 |

*Sufficient to maintain liquid phase.

Having thus described the invention by providing specific examples thereof, it is to be understood that no undue limitations or restrictions are to be drawn by reason thereof and that many variations and modifications are within the scope of the invention.

What is claimed is:

1. A process for removing aluminum alkyls from a feed stream of olefins containing the same which comprises:
(a) in a first contacting zone, contacting said feed stream with a first complex of aluminum alkyl and a complexing agent capable of coordinating with two distinct molar amounts of aluminum alkyl to form two corresponding relatively heat-stable forms thereof, said first complex being present in amount sufficient to react with substantially all of only the lowest molecular weight aluminum alkyl in said feed stream, and said first complex containing less than its highest molar amount of aluminum alkyl prior to said contacting,
(b) withdrawing from said first contacting zone a first stream comprising olefins of substantially reduced content of said lowest molecular weight aluminum alkyl as compared to said feed stream, and a second complex stream comprising complexing agent containing an increased molar amount of aluminum alkyl as compared to said first complex,
(c) passing said first stream of step (b) to a second contacting zone,
(d) in said second contacting zone, contacting said first stream with a second complex of aluminum alkyl and a complexing agent capable of coordinating with two distinct molar amounts of aluminum alkyl to form two corresponding relative heatstable forms thereof, said second complex being present in amount sufficient to react with substantially all the remaining aluminum alkyl in said first stream, and said second complex containing less than its highest molar amount of aluminum alkyl prior to said contacting, and
(e) withdrawing from said second contacting zone a third product stream comprising olefins of substantially reduced total aluminum alkyl content as compared to said feed stream, and a fourth complex stream comprising complexing agent containing an increased molar amount of aluminum alkyl as compared to said second complex.

2. The process of claim 1 wherein said fourth complex stream of step (e) is regenerated for recycle to said contacting of step (d) by:
(f) reacting said fourth complex stream with displacing aluminum alkyl in which the alkyl radicals are of lower average carbon chain length than the alkyl radicals in said fourth stream, whereby there results a displacing of high molecular weight aluminum alkyl from said fourth complex stream by lower molecular weight aluminum alkyl,
(g) withdrawing from the reacting of step (f) a fifth aluminum alkyl stream in which the alkyl radicals are of higher average carbon chain length than said displacing aluminum alkyl, and a sixth complex stream comprising a complexing agent containing aluminum alkyl in which the alkyl radicals are of lower average carbon chain length than the alkyl radicals in said fourth complex stream,
(h) regenerating said sixth complex stream by heating to produce a seventh complex stream comprising complexing agent containing a decreased molar amount of aluminum alkyl as compared to said sixth complex stream, and an eighth stream comprising aluminum alkyls, and
(i) returning said seventh complex stream to said contacting of said step (d) as at least a portion of said second complex.

3. The process of claim 2 wherein said second complex stream of step (b) is regenerated for recycle to said contacting of step (a) by:
(j) heating said second complex stream to produce a ninth complex stream comprising complexing agent containing a decreased molar amount of aluminum alkyl as compared to said second complex stream, and a tenth aluminum alkyl stream, and
(k) returning said ninth complex stream to said contacting of step (a) as at least a portion of said first complex.

4. A process for removing aluminum alkyls from a feed stream of olefins containing the same which comprises:
(a) contacting said feed stream with a first complex of the formula $A \cdot [Al(R)_3]_m$, said A comprising a complexing agent capable of also forming complexes of the formula $A \cdot [Al(R)_3]_n$ where $n$ is greater than $m$ and each R is an alkyl group, said first complex being present in amount sufficient to react with substantially all of only the lowest molecular weight aluminum alkyl in said feed streams,
(b) withdrawing from the contacting of step (a) an olefin stream of substantially reduced content of said lowest molecular weight aluminum alkyl as compared to said feed stream, and a stream of complexing agent of the formula $A \cdot [Al(R)_3]_n$, where A, $n$, and R are as before defined,
(c) passing the withdrawn olefin stream of step (b) into contact with a second complex of the formula $A \cdot [Al(R)_3]_m$ in amount sufficient to react with substantially all of the remaining aluminum alkyl therein, and
(d) withdrawing from the contacting of step (c) an olefin product stream and a stream of complexing agent of the formula $A \cdot [Al(R)_3]_m \cdot [Al(R')_3]_p$, where R' is an alkyl group of greater average carbon chain length than said R, and $p$ is at most equal to $n$ minus $m$.

5. The process of claim 4 wherein the withdrawn complexing agent of step (d) is regenerated by:
(e) reacting said agent with an aluminum alkyl of the formula $Al(R)_3$, whereby there is produced a complex of the formula $A \cdot [Al(R)_3]_n$, and an aluminum alkyl stream of the formula $Al(R')_3$,
(f) withdrawing from the reacting of step (e) said complex,
(g) regenerating the withdrawn complex of step (f) by heating to produce an aluminum alkyl of the formula $Al(R)_3$ and a complex of the formula $A \cdot [Al(R)_3]_m$, and
(h) returning the latter complex of step (g) to the contact of step (c) as at least a portion of said second complex.

6. The process of claim 5 wherein said stream of complexing agent of step (b) is regenerated by:
(i) heating said stream to produce aluminum alkyl of the formula $Al(R)_3$ and a complex of the formula $A \cdot [Al(R)_3]_m$, and
(j) returning the complex produced in step (i) to the contacting of step (a) as at least a portion of said first complex.

7. The process of claim 4 wherein the A of said first and said second complex are the same compound.

8. The process of claim 7 wherein A comprises tetramethyl ammonium chloride, R is ethyl, R' is mixed straight-chain alkyl of greater than 2 carbon average, $m$ is at least 1 and less than 2, and $n$ is at most 2.

9. The process of claim 5 wherein said passing of step (c) and said regenerating are effected cyclically by periodically switching the olefin stream fed to step (c) among a plurality of zones of contact with said second complex and by effecting the regeneration of steps (e) through (h) on a zone of contact other than the one to which olefin is then being fed.

10. A process for removing aluminum alkyls from a feed stream of hydrocarbon containing the same which comprises:
(a) contacting said feed stream with a first complex of the formula $A \cdot [Al(R)_3]_m$, said A comprising a complexing agent capable of also forming complexes of the formula $A \cdot [Al(R)_3]_n$ where $n$ is greater than $m$ and each R is an alkyl group, said first complex being present in amount sufficient to react with substantially all of only the lowest molecular weight aluminum alkyl in said feed streams,
(b) withdrawing from the contacting of step (a) a hydrocarbon stream of substantially reduced content of said lowest molecular weight aluminum alkyl as compared to said feed stream, and a stream of complexing agent of the formula $A \cdot [Al(R)_3]_n$, where A, $n$, and R are as before defined,
(c) passing the withdrawn hydrocarbon stream of step (b) into contact with a second complex of the formula $A \cdot [Al(R)_3]_m$ in amount sufficient to react with substantially all of the remaining aluminum alkyl therein, and
(d) withdrawing from the contacting of step (c) a hydrocarbon product stream and a stream of complexing agent of the formula $$A \cdot [Al(R)_3]_m \cdot [Al(R')_3]_p$$

where R' is an alkyl group of greater average carbon chain length than said R, and $p$ is at most equal to $n$ minus $m$.

References Cited

UNITED STATES PATENTS 3,228,201  1/1966  Golde _____ 260—677

FOREIGN PATENTS 631,263  11/1961  Canada.
255,170  7/1960  Great Britain.

DELBERT E. GANTZ, *Primary Examiner.*

J. O. MYERS, *Assistant Examiner.*